(12) United States Patent
Matsumoto et al.

(10) Patent No.: US 12,328,006 B2
(45) Date of Patent: Jun. 10, 2025

(54) POWER CONVERTOR

(71) Applicant: Mitsubishi Electric Corporation, Tokyo (JP)

(72) Inventors: Koki Matsumoto, Tokyo (JP); Sadayuki Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 18/572,789

(22) PCT Filed: Jun. 28, 2021

(86) PCT No.: PCT/JP2021/024372
§ 371 (c)(1),
(2) Date: Dec. 21, 2023

(87) PCT Pub. No.: WO2023/275937
PCT Pub. Date: Jan. 5, 2023

(65) Prior Publication Data
US 2024/0297505 A1 Sep. 5, 2024

(51) Int. Cl.
*H02J 3/40* (2006.01)
*H02J 3/38* (2006.01)

(52) U.S. Cl.
CPC ............... *H02J 3/40* (2013.01); *H02J 3/388* (2020.01); *H02J 2203/20* (2020.01)

(58) Field of Classification Search
CPC ........... H02J 3/40; H02J 3/388; H02J 2203/20
See application file for complete search history.

(56) References Cited

U.S. PATENT DOCUMENTS 10,218,261 B2 * 2/2019 Lung .................. H02M 1/36
2013/0294119 A1 11/2013 Kimura et al.
2014/0092657 A1 4/2014 Fujii
2016/0006338 A1 1/2016 Sakimoto et al.
2023/0115683 A1 4/2023 Inoue

FOREIGN PATENT DOCUMENTS

| JP | 2004-187422 A | 7/2004 |
| JP | 5589141 B2 | 9/2014 |
| JP | 5762757 B2 | 8/2015 |
| JP | 5969094 B1 | 8/2016 |
| JP | 6084863 B2 | 2/2017 |
| JP | 2020-068552 A | 4/2020 |

OTHER PUBLICATIONS

International Search Report and Written Opinion mailed on Sep. 7, 2021, received for PCT Application PCT/JP2021/024372, filed on Jun. 28, 2021, 8 pages including English Translation.

* cited by examiner

*Primary Examiner* — Carlos Amaya
(74) *Attorney, Agent, or Firm* — XSENSUS LLP

(57) ABSTRACT

A virtual synchronous generator controller included in a controller of a power convertor generates a first command value of a frequency of a second voltage and a second command value of a phase of the second voltage by making an active power value and an active power target value correspond respectively to electrical energy and mechanical energy of a motion equation of a rotor of a synchronous generator to simulate an operation of the synchronous generator. When a turn-on condition is satisfied, a determination unit switches a connection state from a non-conduction state to a conduction state by controlling a relay that causes the connection state between an inverter and an AC power system to be selectively switched between the conduction state and the non-conduction state.

6 Claims, 7 Drawing Sheets

POWER CONVERTOR

CROSS-REFERENCE TO RELATED APPLICATION

This application is a national stage application, filed under 35 U.S.C. § 371, of International Patent Application No. PCT/JP2021/024372, filed Jun. 28, 2021, the entire contents of which are incorporated herein by reference.

TECHNICAL FIELD

The present disclosure relates to a power convertor to be interconnected with an AC power system.

BACKGROUND ART

Conventionally, there is known a power convertor to be interconnected with an AC power system. For example, U.S. Pat. No. 5,969,094 (PTL 1) discloses a system interconnection inverter device that includes: an inverter to convert DC power into AC power; and an LC filter to remove harmonic components from an output of the inverter and to supply the AC power to a commercial system. In the system interconnection inverter device, in the case of interconnection with the commercial power system, after a self-sustained operation is performed, an amplitude, phase, and frequency of a self-sustained system voltage are adjusted to match an amplitude, phase, and frequency of a commercial system voltage, and the operation is switched to a system interconnection operation control while the matching state is maintained. As a result, without providing an inrush current prevention circuit, it is possible to perform interconnection with the commercial system while suppressing an inrush current to a capacitor constituting the LC filter.

CITATION LIST

Patent Literature

PTL 1: U.S. Pat. No. 5,969,094

SUMMARY OF INVENTION

Technical Problem

In the system interconnection inverter device disclosed in PTL 1, after the system interconnection relay is turned on, a current control method is performed as an inverter control method; therefore, it can be difficult to stably maintain the voltage of the commercial system.

The present disclosure has been made to solve a problem as mentioned above, and an object of the present disclosure is to stably maintain the voltage of the AC power system while suppressing the inrush current when the power convertor is interconnected with the AC power system.

Solution to Problem

A power convertor according to the present disclosure converts a DC voltage from a DC power source into an AC voltage for an AC power system. The power convertor includes an inverter, a relay, and a controller. The inverter converts the DC voltage into the AC voltage. The relay causes a connection state between the inverter and the AC power system to be selectively switched between a conduction state and a non-conduction state. The controller receives a first measurement value of a first voltage between the relay and the AC power system, a second measurement value of a second voltage between the relay and the inverter, and a measurement value of a current flowing between the inverter and the AC power system, thereby controlling the inverter and the relay. The controller includes a voltage controller, an active power calculator, a virtual synchronous generator controller, a detector, and a determination unit. The voltage controller controls an amplitude of the second voltage and causes the amplitude to become closer to a voltage amplitude target value. The active power calculator calculates an active power value outputted to the AC power system, by using the first measurement value and a measurement value of the current. The virtual synchronous generator controller generates a first command value of a frequency of the second voltage and a second command value of a phase of the second voltage by making the active power value and an active power target value correspond respectively to electrical energy and mechanical energy of a motion equation of a rotor of a synchronous generator to simulate an operation of the synchronous generator. The detector detects a phase of the first voltage from the first measurement value. The determination unit controls the relay to switch a connection state from the non-conduction state to the conduction state when a turn-on condition is satisfied. The turn-on condition includes: a first condition that an amplitude difference between an absolute value of the first measurement value and an absolute value of the second measurement value is included in a first tolerance; and a second condition that a phase difference between the phase of the first voltage and the second command value is included in a second tolerance.

Advantageous Effects of Invention

With the present disclosure, when the power convertor is interconnected with the AC power system, the virtual synchronous generator controller and the determination unit can stably maintain the voltage of the AC power system while suppressing an inrush current.

DESCRIPTION OF EMBODIMENTS

With reference to the drawings, embodiments of the present disclosure will be described in detail hereinafter. In

First Embodiment

Figure 1:
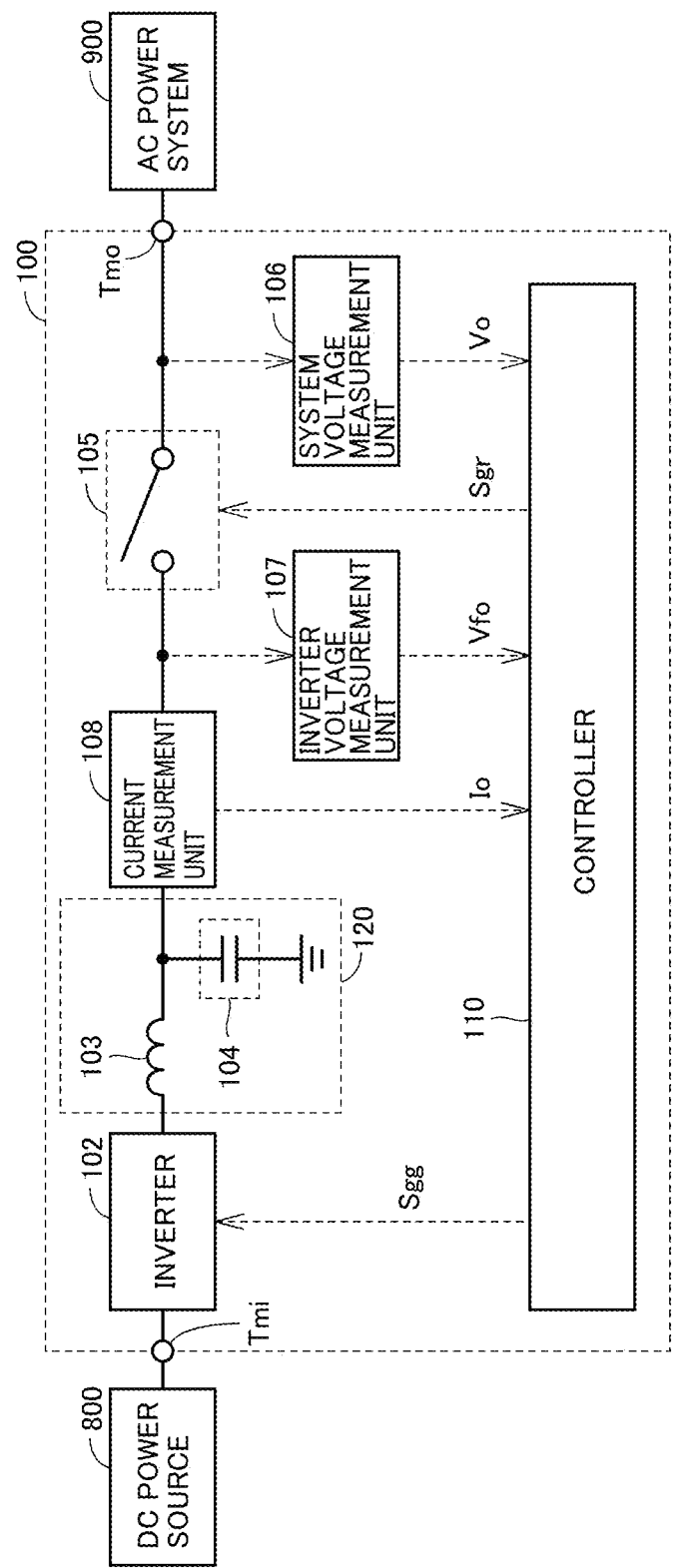
FIG. 1 is a block diagram schematically illustrating an overall configuration of a power convertor according to a first embodiment.

FIG. 1 is a block diagram schematically illustrating an overall configuration of a power convertor 100 according to a first embodiment. FIG. 1 illustrates a block diagram corresponding to a circuit for only one phase; however, the block diagram may be applied to a three-phase system interconnection inverter or a single-phase system interconnection inverter. In the first embodiment, a description will be given taking, as an example, an interconnection inverter for a three-phase system.

As illustrated in FIG. 1, power convertor 100 includes an input terminal Tmi, an output terminal Tmo, an inverter 102, an LC filter 120, a turn-on relay 105, a system voltage measurement unit 106, an inverter voltage measurement unit 107, a current measurement unit 108, and a controller 110. Power convertor 100 converts a DC voltage from a DC power source 800 into an AC voltage for an AC power system 900.

A DC voltage is input from DC power source 800 to input terminal Tmi. DC power source 800 is a power source device that generates a DC voltage. DC power source 800 includes, for example, a solar power generator, a wind power generator of a DC link type, or a storage battery.

Inverter 102 receives the DC voltage from input terminal Tmi. Inverter 102 performs a switching operation in accordance with a gate drive signal Sgg from controller 110 to convert the DC voltage into an AC voltage. A circuit system or a type of a switching element applied to inverter 102 is not limited to a circuit system or a type of a switching element.

LC filter 120 is connected between inverter 102 and current measurement unit 108. LC filter 120 includes a reactor 103 and a capacitor 104. Reactor 103 is connected between inverter 102 and current measurement unit 108. Capacitor 104 is connected between a ground point and a connection point between reactor 103 and current measurement unit 108. LC filter 120 suppresses (filters) a ripple component of a current generated by switching in inverter 102.

Turn-on relay 105 is connected between current measurement unit 108 and output terminal Tmo. Turn-on relay 105 determines a connection state between inverter 102 and output terminal Tmo. That is, turn-on relay 105 causes the connection state to be selectively switched between the non-conduction (cut-off or opened) state (open) and the conduction state (closed) in accordance with a turn-on relay control signal Sgr from controller 110. Hereinafter, the case where the connection state is the conduction state is also referred to as case where turn-on relay 105 is in a turned-on state, and the case where the connection state is the non-conduction state is also referred to as case where turn-on relay 105 is in a turned-off state.

AC power system 900 is connected to output terminal Tmo. AC power system 900 is supplied with an AC voltage from power convertor 100. AC power system 900 is a power system with which power convertor 100 is interconnected. AC power system 900 includes, for example: a normal commercial power system managed by a power company; a microgrid independently managed in a unit of town, or an independent system that is self-sustainably operated in a unit of building or construction. However, the AC voltage of AC power system 900 is maintained by a power source element other than power convertor 100 even when turn-on relay 105 is in a cut-off state and the AC voltage is not supplied from power convertor 100.

Hereinafter, with turn-on relay 105 as a reference, a configuration between turn-on relay 105 and inverter 102 is also referred to as inverter side, and a configuration between turn-on relay 105 and output terminal Tmo is also referred to as system side.

System voltage measurement unit 106 measures a voltage (first voltage) of output terminal Tmo, and outputs, to controller 110, a system voltage measurement value Vo (first measurement value) that is a measurement value of the voltage. Inverter voltage measurement unit 107 measures a voltage (second voltage) that is input to turn-on relay 105, and outputs, to controller 110, an inverter voltage measurement value Vfo (second measurement value) that is a measurement value of the voltage. Current measurement unit 108 measures a current that is input to turn-on relay 105, and outputs, to controller 110, a current measurement value Io that is a measurement value of the current.

Controller 110 controls driving of inverter 102 and opening and closing of turn-on relay 105 by using the measurement values Vo, Vfo, and Io. Controller 110 outputs the gate drive signal Sgg to inverter 102. Controller 110 outputs the turn-on relay control signal Sgr to turn-on relay 105. Controller 110 includes a processing circuit including a central processing unit (CPU) and the like, and a memory in which various programs are stored. A function of controller 110 is implemented by dedicated hardware or a processing circuit that executes a program (software). Note that the information that is input to controller 110 is not limited to the system voltage measurement value Vo, the inverter voltage measurement value Vfo, and the current measurement value Io.

Figure 2:
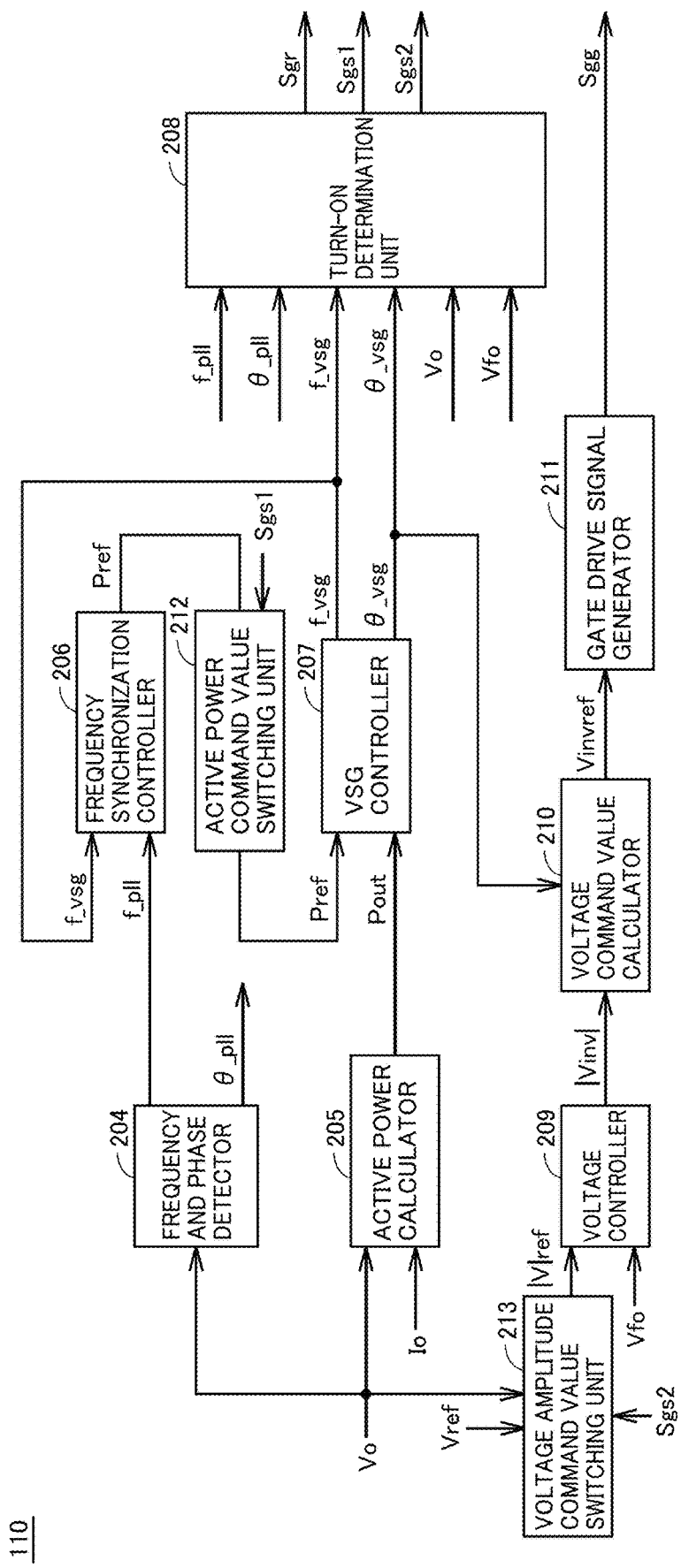
FIG. 2 is a block diagram illustrating an example of an internal configuration of a controller in FIG. 1.

FIG. 2 is a block diagram illustrating an example of an internal configuration of controller 110 in FIG. 1. As illustrated in FIG. 2, controller 110 includes a frequency and phase detector 204 (detector), an active power calculator 205, a virtual synchronous generator (VSG) controller 207 (virtual synchronous generator controller), a frequency synchronization controller 206, a turn-on determination unit 208 (determination unit), a voltage controller 209, a voltage command value calculator 210, a gate drive signal generation unit 211, an active power command value switching unit 212, and a voltage amplitude command value switching unit 213.

Frequency and phase detector 204 sequentially calculates a system voltage frequency f_pll and a system voltage phase θ_pll of the system voltage measurement value Vo (system voltage). Examples of a configuration to implement a function of frequency and phase detector 204 include the following configuration. A d-q conversion is performed, in three-phase system interconnection, on the system voltage measurement value Vo, and the system voltage measurement value Vo is controlled by using proportional-integral control such that a q-axis component of the system voltage measurement value Vo becomes closer to 0. In order to implement the function of frequency and phase detector 204, a method using zero-cross point detection or the like may be performed.

Active power calculator 205 calculates an active power value Pout (consumed in AC power system 900) that is outputted to AC power system 900 by using the system voltage measurement value Vo and the current measurement value Io. Examples of a method of calculating the active power value Pout include the following method. The d-q conversion is performed on each of the system voltage measurement value Vo and the current measurement value Io, and the active power value Pout is obtained from a sum of products; a product of a d-axis voltage of the system voltage measurement value Vo and a d-axis current of the current measurement value Io; and a product of a q-axis voltage of the system voltage measurement value Vo and a q-axis current of the current measurement value Io.

Frequency synchronization controller 206 compares the system voltage frequency f_pll of the system voltage measurement value Vo calculated by frequency and phase detector 204 with an inverter voltage frequency f_vsg determined by VSG controller 207, thereby controlling the inverter voltage frequency f_vsg so that the inverter voltage frequency f_vsg becomes closer to the system voltage frequency f_pll. More specifically, frequency synchronization controller 206 indirectly adjusts the inverter voltage frequency f_vsg via VSG controller 207 by increasing or decreasing an active power command value Pref (active power target value) used in VSG controller 207, depending on the frequency difference between the system voltage frequency f_pll and the inverter voltage frequency f_vsg.

Active power command value switching unit 212 receives, from turn-on determination unit 208, a switching signal Sgs1 indicating whether a state of turn-on relay 105 is the turned-on state or the turned-off state. When turn-on relay 105 is in the turned-off state, active power command value switching unit 212 outputs the active power command value Pref from frequency synchronization controller 206, to VSG controller 207. When turn-on relay 105 is in the turned-on state, active power command value switching unit 212 outputs, as the active power command value Pref, a predetermined value or a value specified from the outside of controller 110 to VSG controller 207 by communication or the like.

By using the active power value Pout and the active power command value Pref, VSG controller 207 generates the inverter voltage frequency f_vsg (first command value) and an inverter voltage phase θ_vsg (second command value) of the output voltage command value for inverter 102.

Voltage amplitude command value switching unit 213 receives, from turn-on determination unit 208, a switching signal Sgs2 indicating whether the state of turn-on relay 105 is the turned-on state or the turned-off state. When turn-on relay 105 is in the turned-off state, voltage amplitude command value switching unit 213 outputs an amplitude |Vo| of the system voltage measurement value Vo to voltage controller 209 as a voltage amplitude command value |V|ref (voltage amplitude target value). When turn-on relay 105 is in the turned-on state, voltage amplitude command value switching unit 213 outputs, as a voltage amplitude command value |V|ref, a predetermined value or a value specified from the outside of controller 110 by communication or the like to voltage controller 209.

Voltage controller 209 receives the voltage amplitude command value |V|ref and the inverter voltage measurement value Vfo, and controls an inverter voltage amplitude |Vinv| such that an amplitude of the inverter voltage measurement value Vfo becomes closer to the voltage amplitude command value |V|ref. Examples of a method of calculating the amplitude of the inverter voltage measurement value Vfo include a method in which the d-q conversion is performed on the inverter voltage measurement value Vfo and the d-axis voltage of the inverter voltage measurement value Vfo is then used. Alternatively, control may be performed in which an effective voltage value is used instead of the amplitude of the inverter voltage measurement value Vfo.

Voltage command value calculator 210 calculates an inverter voltage command value Vinvref for inverter 102 by using the inverter voltage amplitude |Vinv| and the inverter voltage phase θ_vsg. An amplitude of the inverter voltage command value Vinvref is equal to the inverter voltage amplitude |Vinv|, and a phase of the inverter voltage command value Vinvref is equal to the inverter voltage phase θ_vsg. That is, the inverter voltage command value Vinvref is a sine wave signal having the inverter voltage amplitude |Vinv| and the inverter voltage phase θ_vsg.

Gate drive signal generation unit 211 determines drive patterns of a plurality of switching elements included in inverter 102 under a pulse width modulation (PWM) control using the inverter voltage command value Vinvref, and outputs a gate drive signal Sgg corresponding to the pattern to inverter 102.

Turn-on determination unit 208 determines whether the turn-on condition for turn-on relay 105 is satisfied, by using the system voltage measurement value Vo, the system voltage frequency f_pll, the system voltage phase θ_pll, the inverter voltage measurement value Vfo, the inverter voltage frequency f_vsg, and the inverter voltage phase θ_vsg. Depending on a result of determination processing of the turn-on condition for turn-on relay 105, turn-on determination unit 208 outputs the turn-on relay control signal Sgr to turn-on relay 105. Turn-on determination unit 208 respectively outputs the switching signals Sgs1 and Sgs2 in accordance with the turn-on relay control signal Sgr to active power command value switching unit 212 and voltage amplitude command value switching unit 213.

With an increase in distributed power supplies using an inverter such as solar power generators, there is an increase in a proportion of the inverter power source such as power convertor 100 in a total power source amount of the power system. Normally, in the case where an inverter power source operates while being interconnected with an AC power system, a current control (also referred to as system interconnection mode) is often applied. When the inverter power source operates under a current control, the voltage at a system connection end of the inverter power source is often maintained by another power source (for example, a synchronous generator) in the system. The inverter power source causes a desired current to flow by using a phase of a voltage of the synchronous generator as a reference. That is, when the inverter power source is operated under a current control, since the inverter power source does not have enough ability (inertia) to maintain the system voltage, a stability of the system voltage may decrease with an increase in the proportion of the inverter power source.

In order to prevent such a decrease in the stability of the system voltage, the inverter power source needs to be operated under a voltage control (also referred to as self-sustained operating mode) also when the inverter power source is interconnected with the AC power system. However, when the inverter power source is interconnected with the AC power system under a voltage control of the constant voltage constant frequency (CVCF) operation, a phase of the AC voltage supplied from the inverter power source to the AC power system cannot be synchronized with a phase of another voltage source in the AC power system, and a large cross current may occur due to a phase difference between the phase of the AC voltage and the phase of another voltage source. The phase difference can be suppressed under a virtual synchronous generator control. With the virtual synchronous generator control, it is possible to perform an interconnection operation with an AC power source system while contributing to maintaining the system voltage (imparting inertia force) under the voltage control, by causing the inverter power source to simulate operation characteristics of the synchronous generator, thereby imparting, to the inverter power source, an ability (synchronization force) to synchronize with another voltage source.

A detailed description will be given to VSG controller 207 that performs a virtual synchronous generator control as described above. VSG controller 207 causes inverter 102 to have the operation characteristics of the synchronous generator in a simulative manner, thereby implementing a control method in which inverter 102 is imparted with abilities such as inertia force, a synchronization force, and a braking force that the synchronous generator has. First, a structure and operation principle of an actual synchronous generator will be schematically described, because the abilities of a synchronous generator are derived from a structure and operation principle of the synchronous generator.

The synchronous generator is widely used for thermal power generation, nuclear power generation, hydroelectric power generation, and the like. The synchronous generator rotates a huge rotor by using kinetic energy of water vapor generated by combustion of fuel or potential energy of water. A field winding is wound around the rotor. When a field current is made to flow through the rotor, the rotor functions as an electromagnet. A rotating magnetic field is generated by the rotor, and a voltage is induced in a stator coil disposed around the rotor, by electromagnetic induction. The induced voltage assumes the voltage of the power system. Therefore, a frequency of the induced voltage corresponds to a rotational speed of the rotor.

Next, the inertia force, the synchronization force, and the braking force of the synchronous generator will be described. The inertia force is an ability to maintain the output voltage at a constant amplitude and constant frequency. The ability can be described from the operation principle of the synchronous generator that inertia of the rotary motion of the rotor of the synchronous generator relates to the ability to maintain the induced voltage. In addition, the synchronization force is an ability to synchronize the frequency and phase of the voltage of another voltage source connected in parallel to the same system as the synchronous generator with the frequency and phase of the voltage of the synchronous generator, thereby eliminating a cross current between the synchronous generator and the another voltage source. The synchronization force is also realized by acceleration and deceleration of the rotary motion of the rotor. Similarly, the braking force is an ability to attenuate an oscillation phenomenon of the system voltage or current. The braking force is caused by friction, resistance, thermal loss, or the like with respect to the rotary motion of the rotor. As described above, the rotary motion of the rotor of the synchronous generator strongly relates to the abilities including the inertia force, the synchronization force, and the braking force. Therefore, it is important for VSG controller 207 to simulate the characteristics of the rotary motion of the rotor of the synchronous generator. The motion equation that governs the rotary motion of the rotor of the synchronous generator is expressed as an oscillation equation as shown in the following Equation (1).

[Mathematical formula 1]

$$P_m - P_e = M\, d/dt\omega - D(\omega_0 - \omega) \quad (1)$$

In Equation (1), Pm is mechanical input energy received by the rotor, Pe is electrical output energy that is outputted to the system as power, ω is a rotational speed of the rotor, $\omega_0$ is a rated rotational speed of the rotor, M is an inertia constant, and D is a braking coefficient. That is, when the mechanical input energy Pm and the electrical output energy Pe are equal to each other, the rotational speed of the rotor is maintained at a constant speed. When the mechanical input energy Pm is greater than the electrical output energy Pe, the rotor is accelerated. When the mechanical input energy Pm is less than the electrical output energy Pe, the rotor is decelerated.

Figure 3:
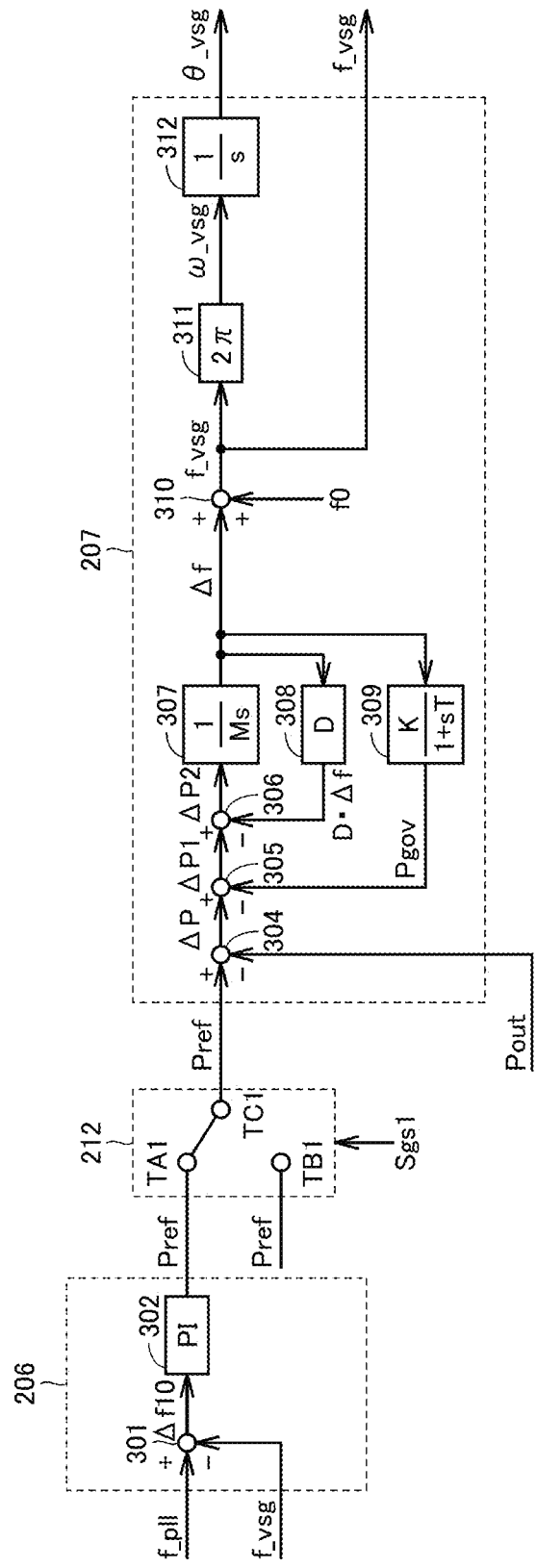
FIG. 3 is a control block diagram illustrating an example of specific configurations of a frequency synchronization controller, a VSG controller, and an active power command value switching unit in FIG. 2.

FIG. 3 is a control block diagram illustrating an example of specific configurations of frequency synchronization controller 206, VSG controller 207, and active power command value switching unit 212 in FIG. 2. First, a configuration of VSG controller 207 will be described. As illustrated in FIG. 3, VSG controller 207 includes subtractors 304, 305, and 306, an integrator 307, a feedback gain block 308, a first-order lag block 309, an adder 310, a conversion gain block 311, and an integrator 312. Both sides of a Laplace transformed oscillation equation, which is Equation (1), are simulated by integrator 307 and feedback gain block 308, which are control blocks.

Subtractor 304 receives the active power command value Pref from active power command value switching unit 212, and outputs, to subtractor 305, a difference ΔP (=Pref−Pout) between the active power command value Pref and the active power value Pout. Subtractor 305 outputs, to subtractor 306, a difference ΔP1 (=ΔP−Pgov) between the difference ΔP and a command value correction term Pgov. Subtractor 306 outputs, to integrator 307, a difference ΔP2 (=ΔP1−D·Δf) between the difference ΔP1 and the product D·Δf of a frequency difference Δf and a feedback gain D, which is the braking coefficient of Equation (1). Integrator 307 outputs, to adder 310, the frequency difference Δf calculated by integrating the difference ΔP2. Note that a coefficient M described in integrator 307 in FIG. 3 corresponds to an inertia constant M of the synchronous generator. The inertia constant M determines a response speed of VSG controller 207. That is, the response speed of VSG controller 207 decreases as the inertia constant M increases, and the response speed of VSG controller 207 increases as the inertia constant M decreases.

The adder 310 outputs a sum of the frequency difference Δf and a reference frequency f0 to the outside of conversion gain block 311 and VSG controller 207 as the inverter voltage frequency f_vsg. Conversion gain block 311 outputs, to integrator 312, an angular frequency ω_vsg (=2π·f_vsg) obtained by multiplying the inverter voltage frequency f_vsg by 2π. Integrator 312 outputs the inverter voltage phase θ_vsg calculated by integrating the angular frequency ω_vsg.

The feedback gain block 308 outputs a product D·Δf of the frequency difference Δf and the feedback gain D to subtractor 306. First-order lag block 309 outputs the command value correction term Pgov in accordance with the frequency difference Δf to subtractor 305.

Regarding analogy (correspondence relationship) between the synchronous generator and power convertor 100 as the inverter power source, the active power value Pout of power convertor 100 corresponds to the electrical output energy Pe. On the other hand, power convertor 100 does not have an energy element corresponding to the mechanical input energy Pm. However, in a steady operation of power convertor 100, it is required to keep the frequency of the AC power output from power convertor 100 constant. Therefore, in the steady operation, the mechanical input energy Pm is almost equal to the electrical output energy Pe. It is possible to interpret the mechanical input energy Pm as a command value (target value) of the electrical output energy Pe. Therefore, in power convertor 100, it is possible to make the active power command value Pref correspond to the mechanical input energy Pm. When the active power value Pout is equal to the active power command value Pref, the inverter voltage frequency f_vsg is equal to the reference frequency f0 (rated frequency). When the active power value Pout is smaller than the active power command value Pref, VSG controller 207 increases the inverter voltage frequency f_vsg from the value at current time to make the active power value Pout closer to the active power command value Pref. When the active power value Pout is larger than the active power command value Pref, VSG controller 207 decreases the inverter voltage frequency f_vsg from the value at current time to make the active power value Pout closer to the active power command value Pref. Since VSG controller 207 performs control simulating the operation characteristics of an actual synchronous generator as described above, power convertor 100 exerts the abilities of the synchronous generator such as the inertia force, the synchronization force, and the braking force. As a result, it is possible to improve stability of AC power system 900 to which power convertor 100 supplies AC power.

In addition, the synchronous generator includes a mechanical mechanism called a governor (speed governor) in order to maintain the rotational speed of the rotor at a rated speed. The governor adjusts, in the synchronous generator, a magnitude of the mechanical input energy Pm in accordance with a deviation of the rotational speed of the rotor from the rated rotational speed. First-order lag block 309 simulates an adjustment function of the rotational speed by the governor as an adjustment function of the inverter voltage frequency f_vsg. First-order lag block 309 determines the command value correction term Pgov in accordance with the frequency difference $\Delta f$ from the reference frequency f0 of the inverter voltage frequency f_vsg. The command value correction term Pgov is subtracted from the active power command value Pref in subtractor 305. The control simulating the governor makes it possible to reduce the frequency difference $\Delta f$ of the inverter voltage frequency f_vsg from the reference frequency f0 even when the active power command value Pref and the active power value Pout are greatly different.

Next, a configuration of frequency synchronization controller 206 will be described. Frequency synchronization controller 206 includes a subtractor 301 and a proportional-integral (PI) controller 302. Subtractor 301 outputs a frequency difference $\Delta f10$ between system voltage frequency f_pll and the inverter voltage frequency f_vsg to PI controller 302. PI controller 302 outputs the active power command value Pref calculated by integrating the frequency difference $\Delta f10$, to active power command value switching unit 212.

Frequency synchronization controller 206 operates when turn-on relay 105 is in the turned-off state. An object of frequency synchronization controller 206 is to control the active power command value Pref so that the inverter voltage frequency f_vsg determined by VSG controller 207 becomes closer to system voltage frequency f_pll detected by frequency and phase detector 204. That is, the object is to eliminate a frequency difference between the voltage on the inverter side and the voltage on the system side. In the configuration illustrated in FIG. 3, the difference $\Delta f10$ between the system voltage frequency f_pll and the inverter voltage frequency f_vsg is input to PI controller 302, and an integral value of the difference $\Delta f10$ calculated by PI controller 302 is set as the active power command value Pref used by the virtual synchronous generator control.

Active power command value switching unit 212 includes nodes TA1, TB1, and TC1. Active power command value switching unit 212 changes a connection state of nodes TA1 to TC1 in accordance with the switching signal Sgs1. Specifically, when turn-on relay 105 is in the turned-off state, active power command value switching unit 212 connects nodes TC1 and TA1. When turn-on relay 105 is in the turned-on state, active power command value switching unit 212 connects nodes TC1 and TB1. An active power command value Pref, which is a predetermined value or a value specified from the outside of controller 110 by communication or the like, is input to node TB1.

Next, a principle will be described in which the inverter voltage frequency f_vsg and system voltage frequency f_pll are synchronized by the above configuration. For example, when system voltage frequency f_pll is higher than the inverter voltage frequency f_vsg, the active power command value Pref, which is the output of frequency synchronization controller 206, has a positive value. In this case, turn-on relay 105 is in the cut-off state (turned-off state) before turned on; therefore, power convertor 100 and AC power system 900 are not connected, and the active power value Pout is 0. Therefore, the difference $\Delta P$ between the active power command value Pref and the active power value Pout, which is input to VSG controller 207, becomes the active power command value Pref (>0). Because the output voltage frequency f_vsg increases due to an effect of the virtual synchronous generator control, the difference $\Delta f10$ decreases. Also when the system voltage frequency f_pll is lower than the inverter voltage frequency f_vsg, the inverter voltage frequency f_vsg decreases, and the difference $\Delta f10$ decreases similarly. Since PI controller 302 includes integration, a steady deviation of the difference $\Delta f10$ is eliminated after a sufficient time has elapsed, and the system voltage frequency f_pll and the inverter voltage frequency f_vsg are synchronized.

In this manner, VSG controller 207 and frequency synchronization controller 206 cause the inverter voltage frequency f_vsg to follow the system voltage frequency f_pll. In addition, since the inverter voltage frequency f_vsg is controlled via VSG controller 207 before turn-on relay 105 is turned on, a method of determining the voltage frequency is commonly used before and after turn-on relay 105 is turned on. As a result, it is possible to prevent the inverter side voltage frequency f_vsg from changing discontinuously at the moment of turning on turn-on relay 105.

Further, as the active power command value Pref that is input from frequency synchronization controller 206 to VSG controller 207, the following values are used: during a period when turn-on relay 105 is not turned on, the value calculated by frequency synchronization controller 206; and during a period when turn-on relay 105 is turned on, the predetermined value or the value specified from the outside of controller 110 by communication or the like, so that, a frequency synchronization effect can be obtained while turn-on relay 105 is not turned on, and the voltage of AC power system 900 can be stabilized by the virtual synchronous generator control while turn-on relay 105 is turned on.

Figure 4:
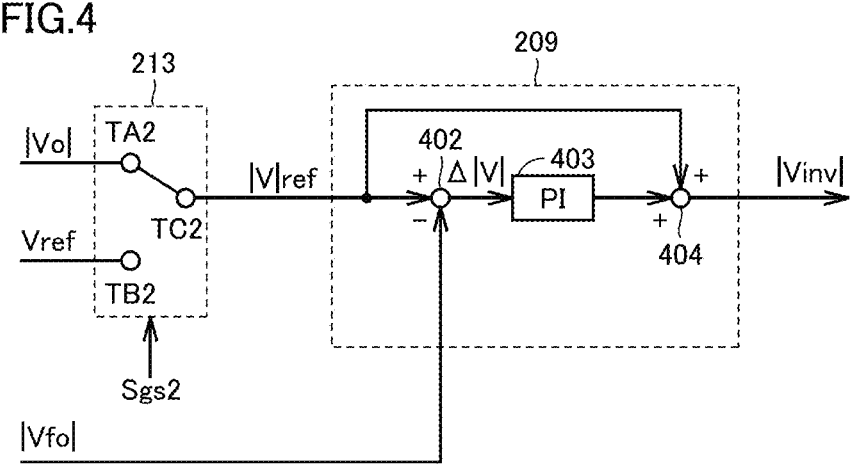
FIG. 4 is a control block diagram illustrating an example of internal configurations of a voltage controller and a voltage amplitude command value switching unit in FIG. 2.

FIG. 4 is a control block diagram illustrating an example of internal configurations of voltage controller 209 and voltage amplitude command value switching unit 213 in FIG. 2. As illustrated in FIG. 4, voltage amplitude command value switching unit 213 includes nodes TA2, TB2, and TC2. An amplitude (absolute value) |Vo| of the system voltage measurement value Vo is input to node TA2. An amplitude command value Vref is input to node TB2. Voltage amplitude command value switching unit 213 changes a connection state of nodes TA2 to TC2 in accordance with the switching signal Sgs2. Specifically, when turn-on relay 105 is in the turned-off state, voltage amplitude command value switching unit 213 connects nodes TC2 and TA2. When turn-on relay 105 is in the turned-on state, voltage amplitude command value switching unit 213 connects nodes TC2 and TB2. Voltage amplitude command value switching unit 213 outputs the voltage amplitude command value |V|ref, which is either the amplitude |Vo| or the amplitude command value Vref, from node TC2 to voltage controller 209.

Voltage controller 209 includes a subtractor 402, a PI controller 403, and an adder 404. Subtractor 402 outputs, to PI controller 403, an amplitude difference Δ|V| between the voltage amplitude command value |V|ref and an amplitude |Vfo| of the inverter voltage measurement value Vfo. PI controller 403 outputs an integral value calculated by integrating the amplitude difference Δ|V|, to adder 404. Adder 404 outputs a sum of the integral value and the voltage amplitude command value |V|ref, as the inverter voltage amplitude |Vinv|.

Voltage controller 209 controls the inverter voltage measurement value Vfo such that the amplitude |Vfo| of the inverter voltage measurement value Vfo becomes closer to the voltage amplitude command value |V|ref. In voltage controller 209, as the voltage amplitude command value |V|ref, the following values are used: during a period when turn-on relay 105 is not turned on, the amplitude |Vo| of the system voltage measurement value Vo; and during a period when turn-on relay 105 is turned on, the amplitude command value Vref, which is the predetermined value or the value specified from the outside of controller 110 by communication or the like, so that the amplitude of the inverter voltage measurement value Vfo is made to follow the amplitude of the system voltage measurement value Vo during the period when turn-on relay 105 is not turned on. As a result, the amplitude of the voltage on the inverter side of turn-on relay 105 and the amplitude of the voltage on the system side can be made close to the same magnitude, so that the turn-on condition of turn-on relay 105 can be easily satisfied. In addition, during the period when turn-on relay 105 is turned on, the amplitude of the voltage output from inverter 102 can be maintained at a desired voltage amplitude.

Figure 5:
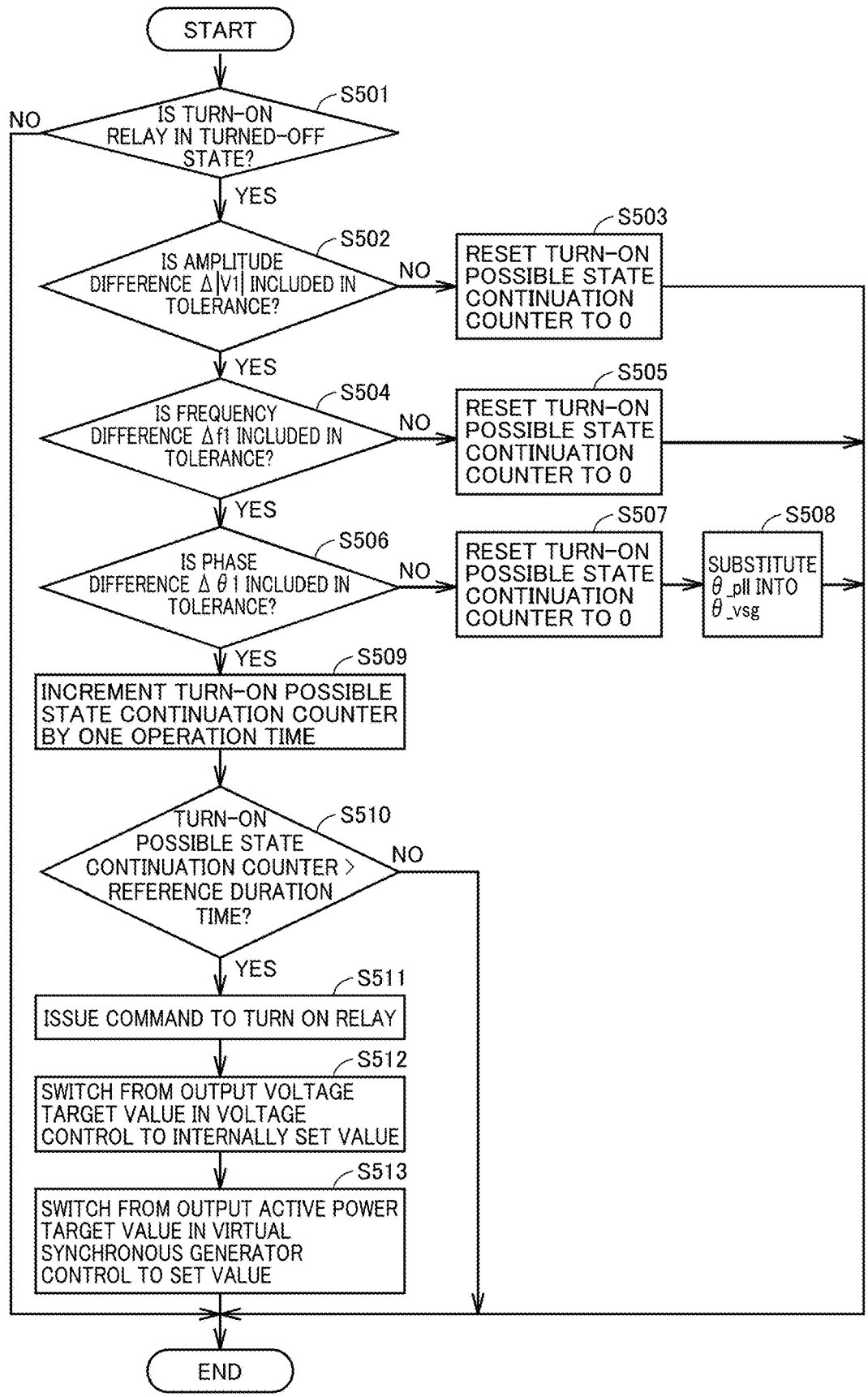
FIG. 5 is a flowchart illustrating a flow of turn-on determination processing (turn-on determination sequence) performed by a turn-on determination unit in FIG. 2.

FIG. 5 is a flowchart illustrating a flow of turn-on determination processing (turn-on determination sequence) performed by turn-on determination unit 208 in FIG. 2. The turn-on determination processing illustrated in FIG. 5 is repeatedly performed every time period (sampling time) determined in advance in controller 110. For example, when a switching frequency of inverter 102 is set to 20 kHz and carrier comparison PWM is used to generate the gate drive signal Sgg, turn-on determination unit 208 performs the turn-on determination processing in accordance with 5 μs that is 1/20 of the switching frequency of inverter 102 (one cycle of the carrier). Hereinafter, a step is simply referred to as S.

As shown in FIG. 5, in S501, turn-on determination unit 208 determines if turn-on relay 105 is in the turned-off state. If turn-on relay 105 is in the turned-on state (S501: NO), turn-on determination unit 208 ends the turn-on determination processing. If turn-on relay 105 is in the turned-off state (S501: YES), turn-on determination unit 208 advances the processing to S502.

In S502, turn-on determination unit 208 determines if a condition (first condition) that an amplitude difference Δ|V1| (=|Vo|−|Vfo|) between the amplitude |Vo| of the system voltage measurement value Vo and the amplitude |Vfo| of the inverter voltage measurement value Vfo is included in a predetermined tolerance (first tolerance) is satisfied. The tolerance can be appropriately determined by an actual machine experiment or simulation. The tolerance is desirably set from a viewpoint that, in order to cause the inrush current occurring at the time of turning on of turn-on relay 105 to be included in an operable current range of inverter 102, what range the amplitude difference Δ|V1| should be in when turn-on relay 105 is turned on. Thresholds (maximum value and minimum value) of the tolerance can be, for example, ±1% with respect to a rated voltage.

If the amplitude difference Δ|V1| is not included in the tolerance (S502: NO), turn-on determination unit 208 resets a turn-on possible state continuation counter to 0 (S503), and ends the processing. The turn-on possible state continuation counter is a counter for recording how long the turning-on state of turn-on relay 105 is continuing. If the amplitude difference Δ|V1| is included in the tolerance (S502: YES), turn-on determination unit 208 advances the processing to S504.

In S504, turn-on determination unit 208 determines if a condition (third condition) that a frequency difference Δf1 (=f_pll−f_vsg) between the system voltage frequency f_pll detected by frequency and phase detector 204 and the inverter voltage frequency f_vsg generated by VSG controller 207 is included in a predetermined tolerance (third tolerance) is satisfied. The tolerance can be appropriately determined by an actual machine experiment or simulation. The tolerance is desirably set from a viewpoint that, in order to cause the inrush current occurring at the time of turning on of turn-on relay 105 to be included in an operable current range of inverter 102, what range the frequency difference Δf1 should be in when turn-on relay 105 is turned on. The tolerance of the frequency difference Δf1 can be, for example, ±0.01 Hz.

If the frequency difference Δf1 is not included in the tolerance (S504: NO), turn-on determination unit 208 resets the turn-on possible state continuation counter to 0 (S505), and ends the processing. If the frequency difference Δf1 is included in the tolerance (S504: YES), turn-on determination unit 208 advances the processing to S506.

In S506, turn-on determination unit 208 determines if a condition (second condition) that a phase difference Δθ1 between the system voltage phase θ_pll detected by frequency and phase detector 204 and the inverter voltage phase θ_vsg generated by VSG controller 207 is included in a predetermined tolerance (second tolerance) is satisfied. The tolerance of the phase difference Δθ1 can be appropriately determined by an actual machine experiment or simulation. The tolerance of the phase difference Δθ1 is desirably set from a viewpoint of in what range the phase difference Δθ1 should be when turn-on relay 105 is turned on so that an inrush current occurring at the time of turning on of turn-on relay 105 can be included in an operable current range of inverter 102. The tolerance of the phase difference Δθ1 can be, for example, within ±5°.

If the phase difference Δθ1 is not included in the tolerance (S506: NO), turn-on determination unit 208 resets the turn-on possible state continuation counter to 0 (S507), and advances the processing to S508. In S508, turn-on determination unit 208 sets the inverter voltage phase θ_vsg at the system voltage phase θ_pll and ends the processing. If the phase difference Δθ1 is included in the tolerance (S506: YES), turn-on determination unit 208 advances the processing to S509.

In a case where the processing by turn-on determination unit 208 reaches S509, each of the amplitude difference Δ|V1|, the frequency difference Δf1, and the phase difference Δθ1 is included in its corresponding tolerance, and turn-on relay 105 is therefore in the turn-on possible state. Turn-on determination unit 208 increments the turn-on possible state continuation counter by one cycle (one operation time) of an execution cycle of the turn-on determination sequence, and advances the processing to S510.

In S510, turn-on determination unit 208 determines if the turn-on possible state continuation counter exceeds a predetermined reference time interval. The reference time interval can be appropriately determined by an actual machine experiment or simulation. The reference time interval is desirably set at sufficiently long time with respect to a delay time from when the turn-on command (on command) is outputted to turn-on relay 105 to when the relay is actually turned on. The reference time interval can be, for example, 5 seconds. The reason why S510 is performed will be described later.

In a case where the processing by turn-on determination unit 208 reaches S511, the turn-on possible state of turn-on relay 105 continues longer than the reference time interval. In S511, turn-on determination unit 208 outputs a turn-on command to turn-on relay 105 as the turn-on relay control signal Sgr, and advances the processing to S512. In S512, turn-on determination unit 208 outputs, to voltage amplitude command value switching unit 213, the switching signal Sgs2 instructing to switch from the voltage amplitude command value |V|ref to a predetermined value or a value specified from the outside of controller 110 by communication or the like, and advances the processing to S513. In S513, turn-on determination unit 208 outputs, to active power command value switching unit 212, the switching signal Sgs1 instructing to switch from the active power command value Pref to a predetermined value or a value specified from the outside of controller 110 by communication or the like, and ends the processing. By the switching processing in S512 and S513, the voltage control and the virtual synchronous generator control are continued also after turn-on relay 105 is turned on.

In FIG. 5, a description has been given on a case in which each of the amplitude difference Δ|V1| in voltage, the frequency difference Δf1 in voltage, and the phase difference Δθ1 in voltage is determined to be included in its corresponding tolerance. However, it is not necessary to determine whether the frequency difference Δf1 is included in the tolerance. For example, in a case where a time period from when the turn-on relay control signal Sgr is outputted to turn-on relay 105 to when turn-on relay 105 is actually turned on is sufficiently short, and at the same time, it is possible to determine, based on an instantaneous value of the voltage, whether turn-on relay 105 can be turned on or not, it may be determined, by using the amplitude difference Δ|V1| and a phase difference 401, whether turn-on relay 105 can be turned on or not.

Here, a description will be given on a reason why a duration time of the turn-on possible state is checked in S510. For example, in a case where all of the three conditions that the amplitude difference Δ|V1|, the frequency difference Δf1, and the phase difference Δθ1 of the voltage at both ends of turn-on relay 105 are included in their corresponding tolerances are satisfied in the turn-on determination at a certain timing, there is a possibility that the three conditions are accidentally satisfied during a transient phenomenon in which the voltage changes relatively largely. If the three conditions are accidentally satisfied, the transient phenomenon may progress, and some us after an end of the turn-on determination processing, any one of the amplitude difference Δ|V1|, the frequency difference Δf1, and the phase difference Δθ1 may deviate from the tolerances in which turn-on is possible. In such a situation, if the turn-on command is outputted to turn-on relay 105 after the turn-on determination, a delay time from when the turn-on command is outputted to when turn-on relay 105 is actually turned on may causes the following situation. The voltage difference between both ends of turn-on relay 105 becomes larger at a moment when turn-on relay 105 is actually turned on than at the time of the turn-on determination, and as a result, the inrush current can be larger than expected. Therefore, in FIG. 5, the turn-on command is outputted to turn-on relay 105 after it is confirmed in S510 that the turn-on possible state continues for a certain period of time. By performing S510, it is possible to confirm the following fact. The case where all of the three conditions that the amplitude difference Δ|V1|, the frequency difference Δf1, and the phase difference Δθ1 of the voltages at both ends of turn-on relay 105 are included in their corresponding tolerances are satisfied is not during a transient phenomenon but is in a steady condition in which the three conditions are continuously satisfied. As a result, an inrush current can be reliably prevented from occurring.

Through the above turn-on determination processing, turn-on relay 105 is turned on after it is confirmed that the amplitude difference Δ|V1|, the frequency difference Δf1, and the phase difference Δθ1 of the voltages at both ends of turn-on relay 105 are continuously included in their corresponding tolerances for a certain period of time. As a result, an inrush current is suppressed at the time of turning on of turn-on relay 105, and power convertor 100 can be additionally interconnected with AC power system 900 without excessive impact. In addition, also after power convertor 100 is interconnected with AC power system 900, the voltage control using the virtual synchronous generator control can be performed, so that the stability of AC power system 900 can be improved.

As described above, the power convertor according to the first embodiment makes it possible to stably maintain the voltage of the commercial system while suppressing the inrush current when the power convertor is interconnected with the AC power system.

Second Embodiment

In the first embodiment, the configuration has been described in which the amplitude of the inverter voltage command value is determined by integrating, in the voltage controller, the amplitude difference between the voltage amplitude command value for the output and the amplitude of the inverter voltage measurement value. In a second embodiment, a description will be given on a configuration in which the amplitude of the inverter voltage command value is determined in the voltage controller through current control.

Figure 6:
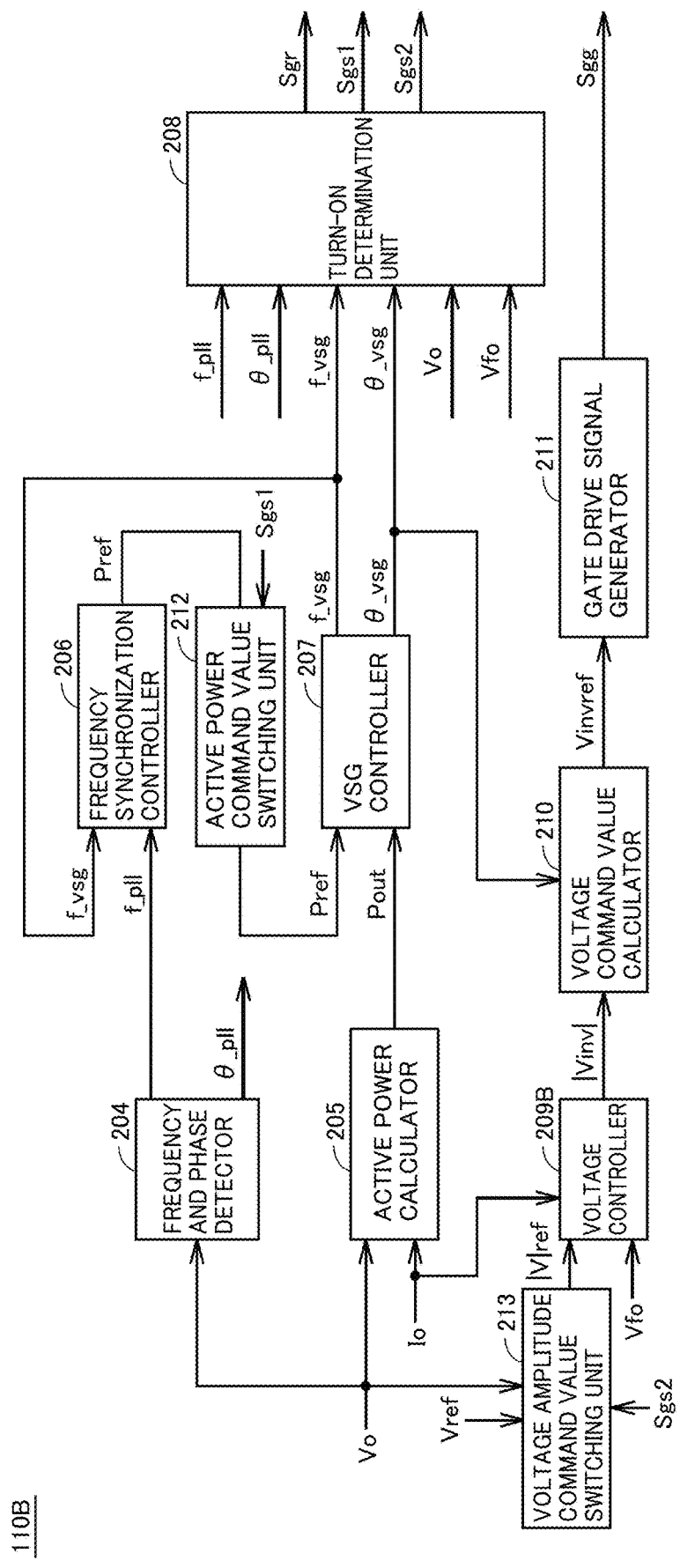
FIG. 6 is a block diagram illustrating an example of an internal configuration of a controller of a power convertor according to a second embodiment.

FIG. 6 is a block diagram illustrating an example of an internal configuration of a controller 110B of a power convertor according to a second embodiment. In a configuration of controller 110B, voltage controller 209 in FIG. 2 is replaced with 209B. The configuration of controller 110B except this replacement is similar to the configuration of controller 110; therefore, the description of the similar configuration will not be repeated. As illustrated in FIG. 6, a current measurement value Io in addition to a voltage amplitude command value |V|ref and an inverter voltage measurement value Vfo is input to voltage controller 209B.

Figure 7:
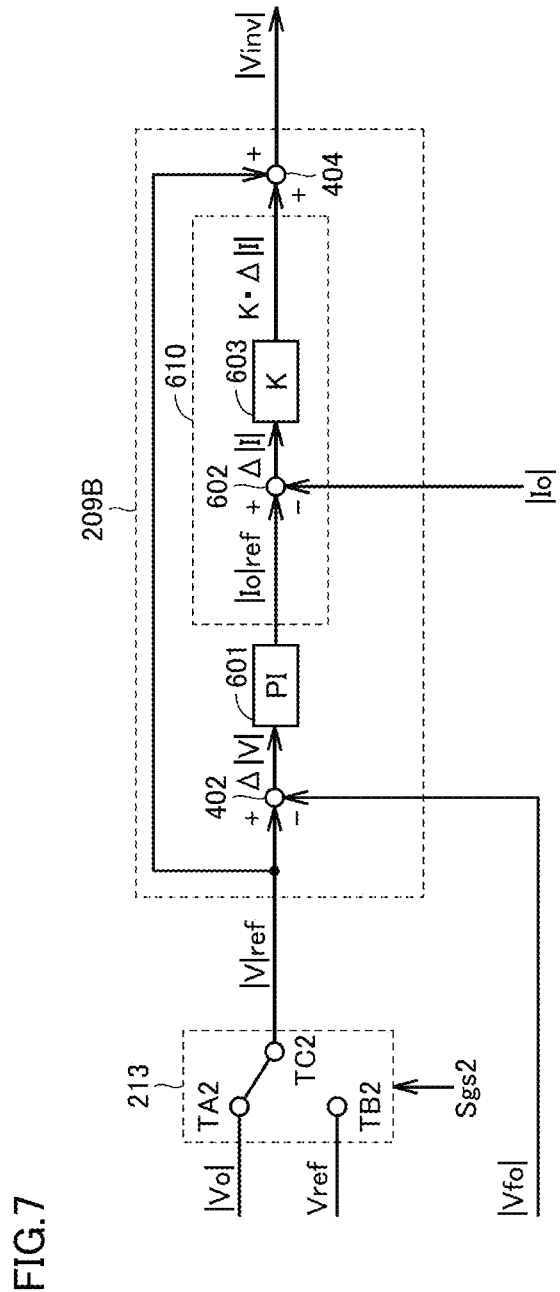
FIG. 7 is a control block diagram illustrating an example of an internal configuration of a voltage controller in FIG. 6.

FIG. 7 is a control block diagram illustrating an example of an internal configuration of voltage controller 209B in FIG. 6. Voltage controller 209B has a configuration in which PI controller 403 in FIG. 4 is replaced with a PI controller 601 and a current controller 610. A configuration of voltage controller 209B except this replacement is similar to the configuration of voltage controller 209; therefore, the description of the similar configuration will not be repeated.

As illustrated in FIG. 7, PI controller 601 outputs, to current controller 610, an amplitude command value |Io|ref that is for a current having been outputted from an inverter 102 and is calculated by integrating an amplitude difference Δ|V|. PI controller 601 determines a current value on the inverter side necessary to cause the inverter voltage measurement value Vfo to become closer to the command value.

Current controller 610 includes a subtractor 602 and a gain block 603. Subtractor 602 outputs, to gain block 603, an amplitude difference Δ|I| between the amplitude command value |Io|ref and an amplitude |Io| of the current measurement value Io. Gain block 603 multiplies the amplitude difference Δ|I| by a gain K and outputs a result to adder 404.

Voltage controller 209B controls an inverter voltage amplitude |Vinv| such that the current measurement value Io becomes closer to a current command value Ioref. In voltage controller 209B, a voltage control is performed as a whole while a current control is partially performed. By performing the current control in the voltage control, it is possible to control the inverter voltage amplitude |Vinv| in a direction in which an inrush current converges. As a result, the inrush current can converge at a higher speed, and generation of the inrush current can be further suppressed.

As described above, the power convertor according to the second embodiment makes it possible to stably maintain the voltage of the commercial system while suppressing the inrush current when the power convertor is interconnected with the AC power system.

The embodiments disclosed herein are also planned to be implemented in appropriate combination within a non-contradictory range. It should be understood that the embodiments disclosed herein are illustrative in all respects and are not restrictive. The scope of the present disclosure is defined not by the above description but by the claims, and is intended to include all modifications in the meaning and scope equivalent to the claims.

REFERENCE SIGNS LIST

100: power convertor, 102: inverter, 103: reactor, 104: capacitor, 105: turn-on relay, 106: system voltage measurement unit, 107: inverter voltage measurement unit, 108: current measurement unit, 110, 110B, 207: VSG controller, 120: LC filter, 204: frequency and phase detector, 205: active power calculator, 206: frequency synchronization controller, 208: turn-on determination unit, 209, 209B: voltage controller, 210: voltage command value calculator, 211: gate drive signal generation unit, 212: active power command value switching unit, 213: voltage amplitude command value switching unit, 301, 304 to 306, 402, 602: subtractor, 302, 403, 601: PI controller, 307, 312: integrator, 308: feedback gain block, 309: first-order lag block, 310, 404: adder, 311: conversion gain block, 603: gain block, 610: current controller, 800: DC power source, 900: AC power system, Io: current measurement value, |Io|ref: amplitude command value, Pe: electrical output energy, Pgov: command value correction term, Pm: mechanical input energy, Pout: active power value, Pref: active power command value, Tmi: input terminal, Tmo: output terminal, Vfo: inverter voltage measurement value, Vinvref: inverter voltage command value, Vo: system voltage measurement value, Vref: amplitude command value, f_vsg: inverter voltage frequency, f_pll: system voltage frequency

The invention claimed is:

1. A power convertor to convert a DC voltage from a DC power source into an AC voltage for an AC power system, the power convertor comprising:
    an inverter to convert the DC voltage into the AC voltage;
    a relay to cause a connection state between the inverter and the AC power system to be selectively switched between a conduction state and a non-conduction state; and
    a controller to receives a first measurement value of a first voltage between the relay and the AC power system, a second measurement value of a second voltage between the relay and the inverter, and a measurement value of a current flowing between the inverter and the AC power system, and to control the inverter and the relay,
    wherein
    the controller includes:
        a voltage controller to control an amplitude of the second voltage to cause the amplitude to become closer to a voltage amplitude target value;
        an active power calculator to calculate an active power value outputted to the AC power system, by using the first measurement value and the measurement value of the current;
        a virtual synchronous generator controller to generate a first command value of a frequency of the second voltage and a second command value of a phase of the second voltage by making the active power value and an active power target value correspond respectively to electrical energy and mechanical energy of a motion equation of a rotor of a synchronous generator to simulate an operation of the synchronous generator;
        a detector to detect a phase of the first voltage from the first measurement value; and
        a determination unit to control the relay to switch the connection state from the non-conduction state to the conduction state when a turn-on condition is satisfied; and
    the turn-on condition includes a first condition that an amplitude difference between an absolute value of the first measurement value and an absolute value of the second measurement value is included in a first tolerance, and a second condition that a phase difference between the phase of the first voltage and the second command value is included in a second tolerance.

2. The power convertor according to claim 1, wherein
the detector detects a frequency of the first voltage from the first measurement value, and
the turn-on condition further includes a third condition that a frequency difference between the frequency of the first voltage and the first command value is included in a third tolerance.

3. The power convertor according to claim 1, wherein, when the first condition is satisfied and the second condition is not satisfied, the controller sets the phase of the first voltage detected by the detector at the second command value.

4. The power convertor according to claim 1, wherein, when a time interval at which the turn-on condition is continuously satisfied exceeds a reference time interval, the determination unit controls the relay to switch the connection state from the non-conduction state to the conduction state.

5. The power convertor according to claim 2, wherein
the controller further includes a frequency synchronization controller to calculate the active power target value by using a frequency difference between the frequency of the first voltage and the frequency of the second voltage, and the virtual synchronous generator controller uses the active power target value calculated by the frequency synchronization controller when the connection state is the non-conduction state, and uses, as the active power target value, a predetermined value or a value inputted from an outside of the controller when the connection state is the conduction state.

6. The power convertor according to claim 1, wherein the voltage controller uses, as the voltage amplitude target value, the amplitude of the first voltage when the connection state is the non-conduction state, and uses, as the voltage amplitude target value, a predetermined value or a value input from an outside of the controller when the connection state is the conduction state.

* * * * *